(12) United States Patent
Maloney

(10) Patent No.: US 8,616,039 B2
(45) Date of Patent: Dec. 31, 2013

(54) METHOD OF MANUFACTURING A CLINCH PIN FASTENER

(75) Inventor: Michael Maloney, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 13/608,209

(22) Filed: Sep. 10, 2012

(65) Prior Publication Data

US 2012/0324978 A1    Dec. 27, 2012

Related U.S. Application Data

(62) Division of application No. 12/757,480, filed on Apr. 9, 2010, now Pat. No. 8,297,899.

(60) Provisional application No. 61/254,467, filed on Oct. 23, 2009.

(51) Int. Cl.
 *B21D 22/00*   (2006.01)
(52) U.S. Cl.
 USPC ................................ 72/352; 72/360; 470/27
(58) Field of Classification Search
 USPC ................... 72/367, 352, 358–360, 356, 267; 470/27–29, 31, 33
 See application file for complete search history.

(56) References Cited

U.S. PATENT DOCUMENTS

| | | | |
|---|---|---|---|
| 2,325,295 A * | 7/1943 | Zaleske | ...................... 411/549 |
| 3,242,962 A | 3/1966 | Dupree | |
| 3,252,495 A | 5/1966 | Waltermire | |
| 3,270,793 A | 9/1966 | Polmon | |
| 3,461,771 A | 8/1969 | Briles | |
| 3,505,923 A * | 4/1970 | Neill | ............................. 411/501 |
| 3,561,102 A * | 2/1971 | Diemer | .......................... 29/509 |
| 3,571,903 A | 3/1971 | Persson | |
| 3,909,913 A | 10/1975 | Tildesley | |
| 3,948,142 A | 4/1976 | McKay et al. | |
| 3,958,389 A | 5/1976 | Whiteside et al. | |
| 3,967,669 A | 7/1976 | Egner | |
| 4,202,243 A * | 5/1980 | Leonhardt | ..................... 411/501 |
| 4,253,323 A * | 3/1981 | Murakami et al. | .............. 72/356 |
| 4,370,794 A | 2/1983 | Bien et al. | |
| 4,499,647 A | 2/1985 | Sakamura et al. | |
| 4,844,673 A | 7/1989 | Kendall | |
| 4,877,363 A | 10/1989 | Williamson et al. | |
| 5,006,024 A | 4/1991 | Siebol | |
| 5,140,735 A | 8/1992 | Ladouceur | |

(Continued)

FOREIGN PATENT DOCUMENTS

DE    7226710    8/1973

*Primary Examiner* — Dana Ross
*Assistant Examiner* — Pradeep C Battula
(74) *Attorney, Agent, or Firm* — Gregory J. Gore

(57) ABSTRACT

A clinch-type fastener is formed by simultaneously creating an undercut during the same forging that creates the head and displacer of the fastener. A fastener blank is compressed end-to-end between top and bottom dies whereby the axial compression of a blank causes the outward bulging of the shank at its midline. Simultaneously, a tapered end point and a tangential interference band are formed provided by a curvilinear-shaped bulge in the shank. As the bulge is formed an undercut is created between the bulge and a shoulder which extends downwardly from a head of the fastener. This method of formation and the fastener produced thereby are particularly suited to the manufacture of small clinch pins having a diameter in the range of 1.0 mm.

7 Claims, 4 Drawing Sheets

(56) References Cited

U.S. PATENT DOCUMENTS

| | | |
|---|---|---|
| 5,356,255 A | 10/1994 | Takahashi et al. |
| RE34,928 E | 5/1995 | Highfield |
| 5,647,114 A | 7/1997 | Pleasant |
| 5,671,521 A | 9/1997 | Briles |
| 5,795,234 A * | 8/1998 | Inada et al. .................... 470/16 |
| 8,297,899 B2 * | 10/2012 | Maloney ....................... 411/339 |
| 2004/0182209 A1 * | 9/2004 | Franco et al. .................... 83/13 |
| 2006/0051181 A1 | 3/2006 | Winton, III |

* cited by examiner

METHOD OF MANUFACTURING A CLINCH PIN FASTENER

RELATED APPLICATION

This patent application is a divisional of co-pending patent application Ser. No. 12/757,480 entitled "Clinch Pin Fastener" filed Apr. 9, 2010 which is related to provisional patent application Ser. No. 61/254,467 entitled "Clinch Pin Fastener" filed on Oct. 23, 2009, priority from which is hereby claimed.

FIELD OF THE INVENTION

The present invention relates to fasteners which attach to metal panels by the cold flow of panel material around the fastener. This type of fastener is generally referred to as a clinch-type fastener.

BACKGROUND OF THE INVENTION

Clinching fasteners are retained in the plates into which they are installed by a displacer feature of the fastener which is followed by an undercut directly beneath it. When pressed into a properly sized hole, metal from the edge of the hole is forced by the displacer to flow into the undercut around the circumference of the fastener. When a clinching or clinch-type stud is manufactured, typically a head and displacer are forged into a pin blank. The undercut is then rolled into the part in a secondary operation. Often, at the same time the threads are rolled onto the body of the pin. When threads are not necessary, the undercut still requires the secondary operation which also incurs the additional cost of cleaning the part. There is therefore a need in the art for forming a clinch-type fastener that includes all the necessary operative features without requiring a secondary operation.

SUMMARY OF THE INVENTION

In order to meet the above-described need in the art, the present invention eliminates secondary formation operations of a clinch-type fastener by creating an undercut during the same forging operation that creates the head and the displacer. Other features that are formed in the present fastener at the same time as the undercut are a tapered point and a tangential interference band provided by a curvilinear shaped bulge in the shank. The configuration of these elements according to the present invention are of paramount importance for fastening pins in the range of 1 millimeter in diameter because very small clinching features require a very tight tolerance to be held for the displacer diameter and height as well as the undercut diameter and shank diameters. The present clinching pin described herein includes a tangential interference band and a tapered point which work together to guide the part through a very small diameter hole in the attached plate while creating a slight interference fit between the hole and the fastener at the interference band diameter only. This creates minimal stresses in the plate while eliminating any tolerance between the inner wall of the hole and the outer diameter of the clinching pin.

More specifically, the Applicant has invented a unitary metal fastener having a top most head that is the largest diameter of the fastener. A shoulder extends axially downward immediately below the head and includes an annular bottom displacer surface for displacing material into which the fastener is installed. A barrel-shaped shank is located immediately below the displacer surface and forms the upper boundary of an undercut located at the juncture of the shank and the shoulder. An outwardly divergent tapered arcuate surface of a top portion of the shank extends downwardly from the undercut. The barrel-shaped shank has a midline bulge forming an interference band along the surface of the shank and is the largest diameter of the shank. Extending downward from the interference band is a convergently tapered surface of the shank extending downward to a bottom end of the fastener.

The method of forming the above-described fastener comprises cold-forging a fastener blank having a head, a shoulder and a shank of reduced diameter. The blank is compressed end-to-end between a top die and a bottom die whereby the axial compression of the blank causes the outward bulging of the shank at its midline. Compression is continued until an undercut is formed between an annular surface of the shoulder and the bulge. The bottom die includes a cone-shaped pocket having a divergent side surface angle of 30° and a bottom pressing surface including a centered upwardly extending projection. The length of the fastener blank shank is within a selected slenderness ratio range such that said fastener bulges when formed and does not buckle during the step of compressing the fastener blank.

In one embodiment, the present invention is used to form an assembly of parts including a panel having an aperture and a plate located in face-to-face relationship with the panel. The plate has an aperture in alignment with the aperture of the panel. The shank of the fastener becomes rigidly affixed to the plate by the cold flow of plate material into the undercut caused by pressing a displacer surface of the shoulder against the plate as said fastener is passed through said panel aperture and into the plate aperture.

As such, those skilled in the art will appreciate that the conception upon which this disclosure is based may readily be utilized as a basis for the designing of other structures, methods, and systems for carrying out the several purposes of the present invention.

DESCRIPTION OF THE PREFERRED EMBODIMENT

Figure 1:
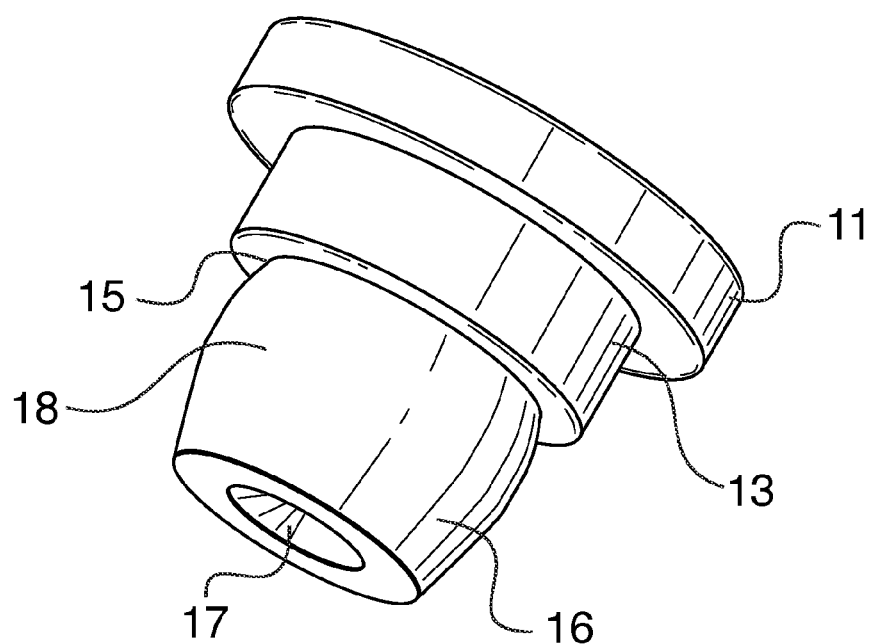
FIG. 1 is a bottom right isometric view of the clinch fastener of the invention.

Referring now to FIG. 1, the present clinching pin is a forged metal part having a head 11, a displacer shoulder 13 and an undercut 15 that receives a cold flow of metal from the plate into which the part is pressed. It further includes a tapered tip 16 and a circumferential interference band 18 along the greatest diameter of its barrel-shaped shank. A recess 17 is present in the bottom end. As will be described further below, all features of this pin are created in one forming operation. Typically, this part is used to hold two sheets of material together. A top panel can be captivated beneath the head of the pin while the body of the pin is clinched into the bottom plate.

Figure 2:
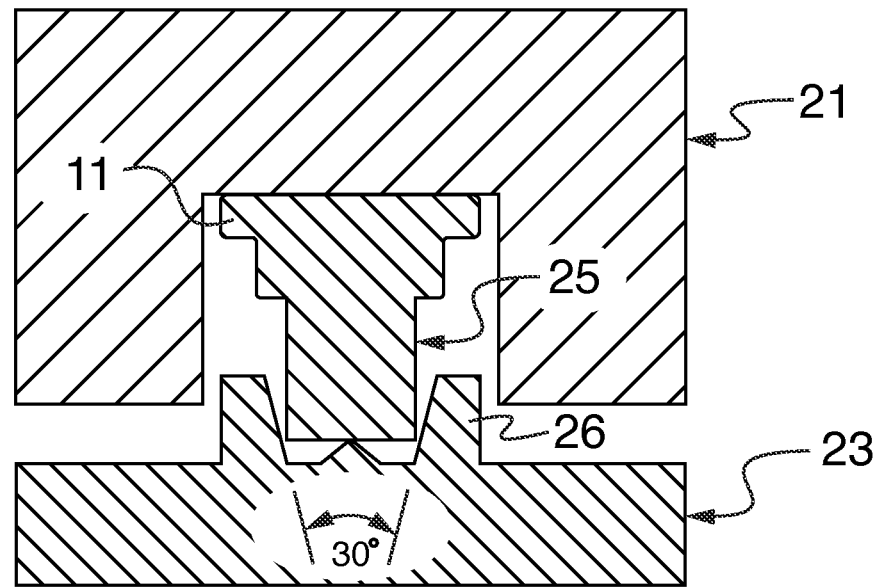
FIG. 2 is a two-part diagrammatic view of the forging operation utilized to create the invention.
Figure 2:
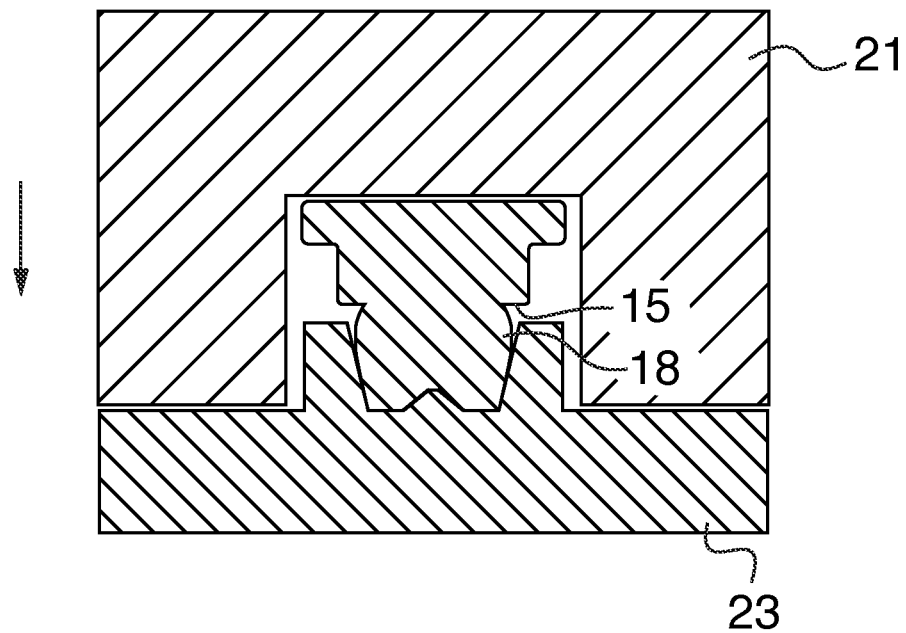

Referring now to FIG. 2, the present fastener is formed using well known cold forging equipment which includes a top die 21 and a bottom die 23 as shown. The head and displacer are formed first as in any heading operation for the creation of a standard bolt or screw. As shown in this figure, the body of the fastener is then formed by compressing the pin between its head and tip. The bottom die 23 includes a cone-shaped tool 26 which is used to form the shank body 25. The tool has a central upward projection and an included angle of 30 degrees for easy release from the part. As depicted in the lower illustration, the forming tool presses on the end of the part causing it to form a bulge 18 above the tool. The original diameter of the pin remains relatively constant at the interface of the pin and the displacer which thus becomes the minor undercut diameter 15.

During the forming operation it is critical that the diameter and length of the pin cause the fastener to yield in compression and not buckle. This condition is designed for, using the slenderness ratio:

$S=L_e/r$ where S is the slenderness ratio, $L_e$ is the effective length of the shank column, and r is the radius of gyration. For a simple cylinder:

$$r=D/4$$

where D is the shank diameter of the pin before forging.

The tack pin forming process can be modeled as a column with the head end fixed and the free end pinned. For this situation:

$$L_e=0.707 \times L$$

where L is the actual length of the pin from under the head to the end.

The critical slenderness ratio is defined as:

$$S_{cr}=\sqrt{(2 \times \pi^2 \times E)/(\sigma_y)} \text{ where:}$$

$S_{cr}$ is the critical slenderness

E is the modulus of elasticity for a given material, and $\sigma_y$ is the yield stress for a given material.

The length of the pin is maintained such that its slenderness ratio "S" is less than the critical slenderness ratio "$S_{cr}$". This condition guarantees that the pin will bulge when formed and not buckle during the process.

A second design variable for this pin is the ratio of the volume of the displacer to the volume of the undercut. For maximum pull-out performance it is best to completely fill the undercut of the fastener. To achieve this, the diameter and height of the embedded portion of the displacer are adjusted to cause the volume ratio "VR" of (displacer volume)/(undercut volume) to be greater than 1. The displacer volume is a simple cylinder with a hole in it, and as such its volume is easy to calculate as:

$V_{disp}=(\pi \times h) \times (r^2-r_h^2)$, where "r" is the radius of the displacer, $r_h$ is the radius of the installation hole, and "h" is the embedded height of the displacer. The shape of the undercut can be approximated as a circulated triangle to calculate its volume, but a more accurate volume can be derived using graphical or computer modeling methods. This formation method is particularly suited to small clinch pins having a diameter in the range of 1.0 mm.

Figure 3:
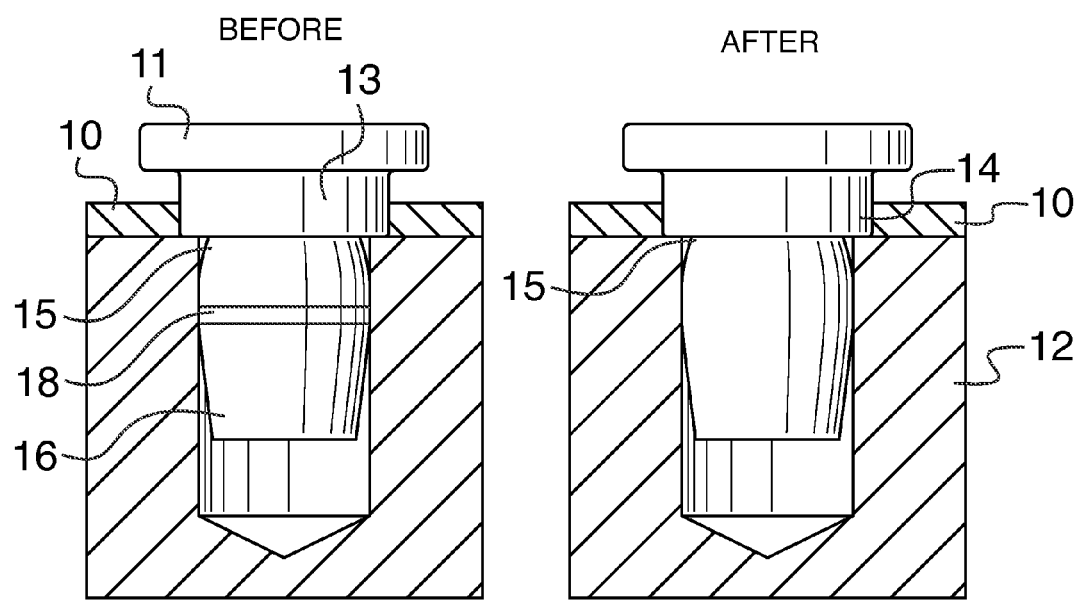
FIG. 3 is a two-part side sectional view showing the before and after sequence of installation of the invention.

Referring now to FIG. 3, when fully formed the present clinch pin has a head 11, a displacer 13, an undercut 15, an interference band 18, and a tapered tip 16. The purpose of the head is to retain panel 10 of any material to a metallic plate 12, much in the way that the head of a nail or a screw retains whatever it is fastening. As shown in the "after" side of this illustration, the displacer lies directly beneath the head of the fastener and consists of two sections. As depicted in this figure, the first section of the displacer comprises the portion directly under the head down to the point where the plate is joined. Thus, there is a portion of the displacer that does not get pressed into the plate. This portion of the displacer remains within the top panel 10 being joined and is very nearly the same height as the thickness of the top panel. As the "after" illustration depicts, the lower portion of the displacer 14 is the portion that is pressed into the plate 12 and displaces material into the undercut directly beneath it. Material that flows into the undercut is trapped above the interference band 18 of the fastener to retain the fastener in the plate.

Figure 4:
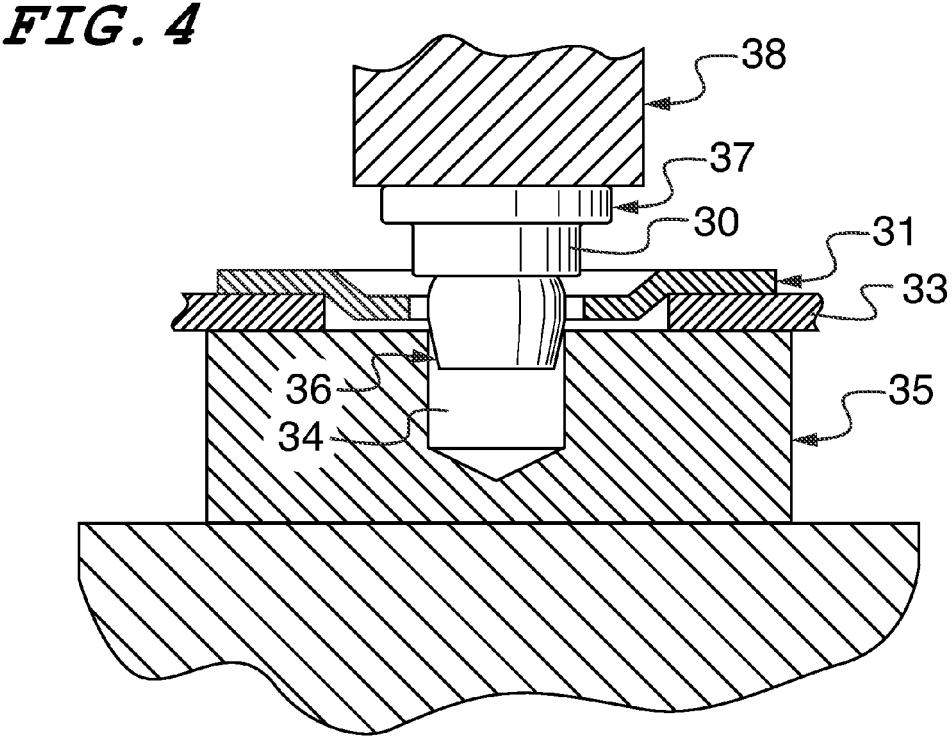
FIG. 4 comprises a two-part front elevation sectional view of the invention showing a sequence of installation.
Figure 4:
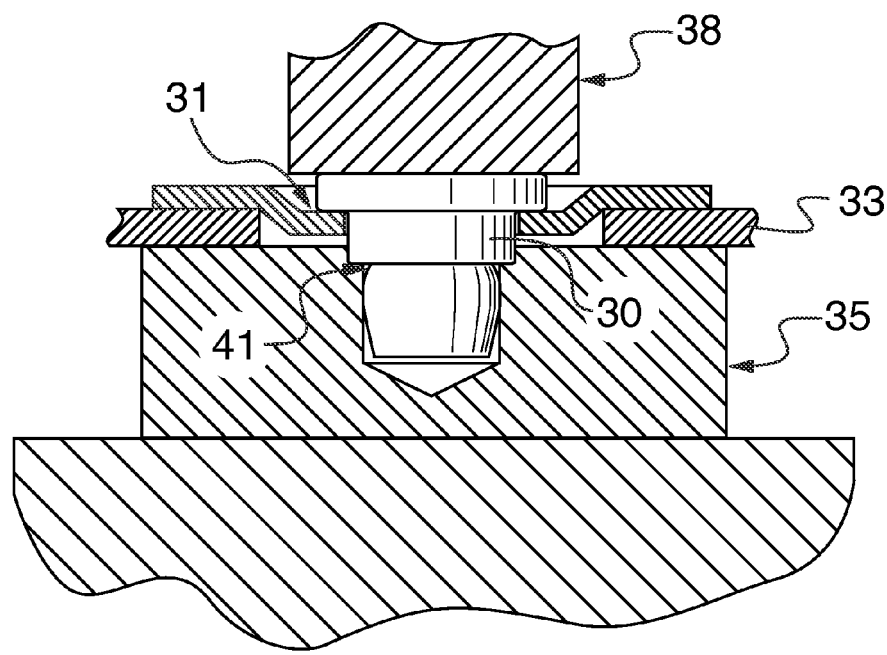

Referring now to FIG. 4, a specific application is shown where the clinch pin of the invention is employed to join three elements, a top panel 31, an intermediate sheet 33 and a bottom plate 35. The intermediate sheet 33 becomes clamped between the top panel and bottom plate when the pin is clinched into the bottom plate. Proper installation of the present clinch pin first requires preparation of the panel, sheet and plate to be joined. The bottom plate 35 must have a hole, in this instance a blind hole 34 that is equal to or slightly less than the diameter of the interference band 18 of the fastener. The top panel 31 must have a hole that is slightly greater than the diameter of displacer 30 and the thickness of the panel must be accommodated in the height of the displacer.

This assembly is created as follows. With the panel, sheet and plate properly prepared, the bottom plate 35 is first placed over an anvil, sheet and the top panel are placed over the bottom plate with the installation holes aligned. The tapered tip of the fastener 36 is then placed through the hole in the top panel and partway down the hole 34 in the bottom plate. Finally, a flat punch 38 is used to press against the head 37 of the fastener driving it downward into the hole until the underside of the head of the fastener contacts the top panel 31 as shown in the lower illustration. The height of displacer 30 is dimensioned so that the undercut 41 is filled with the cold flow of material from lower plate 35 as the underside of the head contacts the top panel. Additional force loading against the head after contact further tightens the joint.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of manufacturing by cold-forging a free-standing metal fastener comprising:
   providing a clinch pin fastener blank having a head, a shoulder and a shank of reduced diameter in that order top to bottom;
   compressing end-to-end the fastener blank only between a top die and a bottom die whereby the axial compression of the blank causes the outward bulging of the shank at a midline thereof; and
   continuing said compression until an undercut is formed contiguously between the bulge and the shoulder.

2. The method of claim 1 wherein said bulge is an arcuate surface in the middle of said shank.

3. The method of claim 1 wherein said bottom die includes a cone-shaped pocket for receiving said fastener blank.

4. The method of claim 3 wherein said cone-shaped pocket has a divergent side surface angle of 30°.

5. The method of claim 3 wherein said bottom die pocket further includes a centered upward projection.

6. The method of claim 1 wherein the length of the fastener blank shank is within a selected slenderness ratio range such that said fastener bulges when formed and does not buckle during the step of compressing the fastener blank.

7. The method of claim 6 wherein the length of the fastener shank is within a selected slenderness ratio less than $\sqrt{(2\times\pi^2\times E)/(\sigma y)}$, where E is the modulus of elasticity and $\sigma y$ is the yield stress for the shank material.

* * * * *